US011708910B2

(12) United States Patent
Duong et al.

(10) Patent No.: US 11,708,910 B2
(45) Date of Patent: Jul. 25, 2023

(54) SEALS

(71) Applicant: SAINT-GOBAIN PERFORMANCE PLASTICS CORPORATION, Solon, OH (US)

(72) Inventors: Van Duong, Corona, CA (US); Bedros J. Taslakian, Northridge, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 213 days.

(21) Appl. No.: 16/730,103

(22) Filed: Dec. 30, 2019

(65) Prior Publication Data

US 2020/0208743 A1    Jul. 2, 2020

Related U.S. Application Data

(60) Provisional application No. 62/786,765, filed on Dec. 31, 2018.

(51) Int. Cl.
*F16J 15/32* (2016.01)
*F16J 15/3284* (2016.01)
*F16J 15/3232* (2016.01)
*F16J 15/3208* (2016.01)

(52) U.S. Cl.
CPC ....... *F16J 15/3284* (2013.01); *F16J 15/3208* (2013.01); *F16J 15/3232* (2013.01)

(58) Field of Classification Search
CPC ... F16J 15/3208; F16J 15/3232; F16J 15/3284
See application file for complete search history.

(56) References Cited

U.S. PATENT DOCUMENTS

| | | | |
|---|---|---|---|
| 2,162,104 | A | 6/1939 | Mosher |
| 2,168,818 | A | 8/1939 | Condon |
| 2,626,822 | A | 1/1953 | Boyd |
| 2,736,584 | A | 2/1956 | Riesing |
| 3,197,217 | A | 7/1965 | Mastrobattista et al. |
| 4,108,447 | A | 8/1978 | Scholin |
| 4,239,240 | A | 12/1980 | Wilkinson |

(Continued)

FOREIGN PATENT DOCUMENTS

| | | |
|---|---|---|
| EP | 3315829 A1 | 5/2018 |
| JP | H057529 U | 7/1993 |

(Continued)

OTHER PUBLICATIONS

International Search Report and Written Opinion for PCT/US2019/068942, dated Apr. 28, 2020, 12 pages.

*Primary Examiner* — Eugene G Byrd
*Assistant Examiner* — L. Susmitha Koneru
(74) *Attorney, Agent, or Firm* — Abel Schillinger, LLP; Robert N Young

(57) ABSTRACT

A seal comprising: an annular body defining an inner sidewall and an outer sidewall extending from a base; and a plurality of energizing elements disposed within a recess between the inner and outer sidewalls, wherein at least two adjacent energizing elements of the plurality of energizing elements have different unit loads as compared to one another, and wherein the at least two adjacent energizing elements contact the inner sidewall.

18 Claims, 3 Drawing Sheets

(56) References Cited

U.S. PATENT DOCUMENTS

| | | | | |
|---|---|---|---|---|
| 4,655,945 | A | * | 4/1987 | Balsells ............... C10M 111/00 508/106 |
| 4,804,290 | A | * | 2/1989 | Balsells ............... F04B 53/143 403/368 |
| 5,984,316 | A | * | 11/1999 | Balsells ............... F16J 15/3236 277/553 |
| 5,992,856 | A | * | 11/1999 | Balsells ............... F16J 15/3212 277/564 |
| 6,053,029 | A | * | 4/2000 | Nakajima ........... G01M 13/005 73/9 |
| 6,767,016 | B2 | | 7/2004 | Gobeli et al. |
| 7,052,020 | B2 | | 5/2006 | Gobeli et al. |
| 7,753,376 | B2 | | 7/2010 | Kondo et al. |
| 8,554,850 | B2 | * | 10/2013 | Yanagi ................. G06F 3/1204 709/206 |
| 2002/0153664 | A1 | * | 10/2002 | Schroeder ................ F16J 15/56 277/551 |
| 2005/0093246 | A1 | | 5/2005 | Dietle et al. |
| 2006/0022414 | A1 | * | 2/2006 | Balsells ............... F16J 15/3212 277/572 |
| 2006/0214380 | A1 | | 9/2006 | Dietle et al. |
| 2007/0013143 | A1 | | 1/2007 | Schroeder et al. |
| 2007/0180987 | A1 | * | 8/2007 | An ...................... F16J 15/3232 92/165 R |
| 2010/0166582 | A1 | * | 7/2010 | Racicot ................ F16J 15/3212 277/650 |
| 2010/0219585 | A1 | * | 9/2010 | Roddis .................. F16J 15/164 277/347 |
| 2010/0225065 | A1 | | 9/2010 | Nobrega |
| 2010/0237566 | A1 | * | 9/2010 | Balsells ............... F16J 15/3236 277/637 |
| 2011/0006486 | A1 | * | 1/2011 | Niknezhad ........... F16J 15/3232 29/428 |
| 2018/0112778 | A1 | * | 4/2018 | Dilmaghanian ....... F16J 15/164 |
| 2018/0245558 | A1 | | 8/2018 | Eck |

FOREIGN PATENT DOCUMENTS

| | | | | |
|---|---|---|---|---|
| KR | 20070030953 | A | * 3/2007 | ............. F16J 15/447 |
| WO | 2020142432 | A1 | 7/2020 | |

* cited by examiner

SEALS

CROSS-REFERENCE TO RELATED APPLICATION(S)

This application claims priority under 35 U.S.C. § 119(e) to U.S. Patent Application No. 62/786,765 entitled "SEALS," by Van DUONG et al., filed Dec. 31, 2018, which is assigned to the current assignee hereof and incorporated herein by reference in its entirety.

FIELD OF THE DISCLOSURE

The present disclosure relates to seals, and more particularly to annular seals for sealing between a shaft and a housing.

RELATED ART

Seals are generally utilized to isolate areas of an assembly from one another. For example, seals can be used between shafts and housings to prevent fluid penetration into or egress from a sealed portion of the assembly. Seals can operate in rotational capacities and reciprocal capacities.

Industries utilizing seals continue to demand improved seals capable of meeting increasingly stringent operational standards and protocols.

BRIEF DESCRIPTION OF THE DRAWINGS

Embodiments are illustrated by way of example and are not intended to be limited in the accompanying figures.

DETAILED DESCRIPTION

Figure 1:
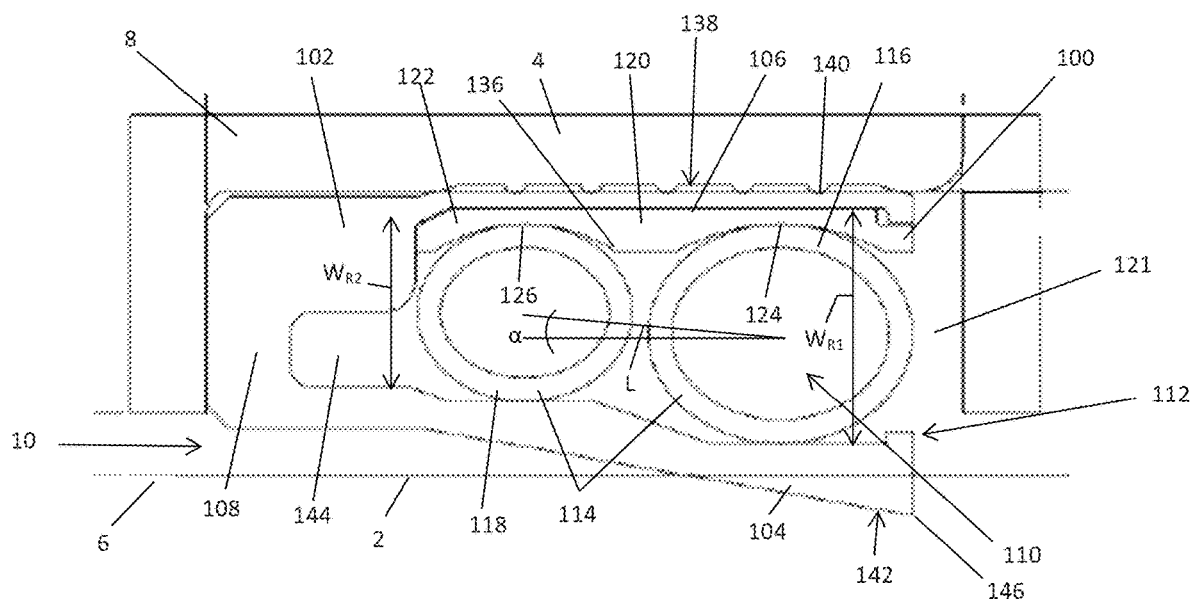
FIG. 1 includes a cross-sectional view of a seal in accordance with an embodiment disposed within a hardware.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the seal arts.

In accordance with an embodiment described herein, a seal can include an annular body defining an inner sidewall and an outer sidewall extending from a base. A plurality of energizing elements can be disposed within a recess formed between the inner and outer sidewalls. At least two adjacent energizing elements of the plurality of energizing elements can have different unit loads as compared to one another. In an embodiment, at least two adjacent energizing elements are adapted to contact the inner sidewall.

In a particular embodiment, the at least two adjacent energizing elements can contact the outer sidewall. In another particular embodiment, a resilient ring can be disposed between the at least two adjacent energizing elements and the outer sidewall of the annular body. In an embodiment, the resilient ring can be adapted to contact all of the plurality of energizing elements. In another embodiment, the resilient ring can include a body defining a first recess adapted to receive a first energizing element of the plurality of energizing elements and a second recess adapted to receive a second energizing element of the plurality of energizing elements. In an embodiment, the first and second recesses can be spaced apart from one another. In another embodiment, the first and second recesses can include different radii of curvature as compared to one another. In yet a more particular embodiment, the recess closer to the base of the annular body can have a smaller radius of curvature as compared to the recess further from the base.

In an embodiment, the resilient ring can further include a first retaining lip adapted to prevent axial displacement of the energizing element from the seal. In a more particular embodiment, the retaining lip can extend from the recess axially beyond the inner sidewall, the outer sidewall, or both. In certain instances, the resilient ring can further include a second retaining lip disposed between the at least two adjacent energizing elements and adapted to prevent axial displacement of at least one of the energizing elements from the seal.

In an embodiment, the resilient ring floats relative to the annular body. In another embodiment, the resilient ring can have a generally linear cross-sectional profile.

In an embodiment, at least one of the plurality of energizing elements can include a helical spring. In another embodiment, at least one of the plurality of energizing elements can include a cantilever spring. In a particular instance, the at least two adjacent energizing elements of the plurality of energizing elements are the same type of energizing element.

In an embodiment, the seal includes a first energizing element disposed in the recess and a second energizing element disposed between the base and the first energizing element. In an embodiment, the first and second energizing elements can have different unit loads (lbf/in) as compared to one another. That is, for instance, the first and second energizing elements can compensate for different loads provided by the annular body. In a more particular embodiment, the second energizing element can have a higher unit load as compared to the first energizing element. In an embodiment, the first energizing element can have a first unit load, $L_{S1}$, and the second energizing element can have a second unit load, $L_{S2}$, and $L_{S2}$ can be at least 1.01 $L_{S1}$, at least 1.02 $L_{S1}$, at least 1.05 $L_{S1}$, at least 1.1 $L_{S1}$, at least 1.2 $L_{S1}$, at least 1.3 $L_{S1}$, at least 1.4 $L_{S1}$, at least 1.5 $L_{S1}$, or at least 2 $L_{S1}$. In an embodiment, the first energizing element can have a greater diameter as compared to the second energizing element. In another embodiment, the first energizing element can have a higher spring constant as compared to the second energizing element.

In an embodiment, the inner and outer sidewalls are different lengths as compared to one another. In a more particular embodiment, the inner sidewall is shorter than the outer sidewall. In another embodiment, the inner and outer sidewalls have same, or similar, lengths as compared to one another. In an embodiment, the seal defines a central axis and the inner sidewall is canted relative to the central axis. In another embodiment, the outer sidewall is generally parallel with the central axis of the seal.

In an embodiment, the inner sidewall can define a first thickness at a first location and a second thickness at a second location. The first thickness can be different from the second thickness. In an embodiment, the first thickness is greater than the second thickness and the second location is disposed between the first location and the base of the seal.

In an embodiment, the outer sidewall defines an outer surface of the seal. In a more particular embodiment, the outer surface of the outer sidewall comprises a plurality of recesses. The recesses can extend around at least a portion of the circumference of the seal.

In an embodiment, the base of the annular body defines a cutout extending from the recess. The cutout can be adapted to permit greater flexure of the inner and outer sidewalls relative to one another as compared to a seal devoid of a cutout. In an embodiment, the base of the seal is adapted to be spaced apart from the shaft in the installed state.

In an embodiment, the seal is adapted to operate at a range of temperatures between −100° F. and 450° F. In another embodiment, the seal is adapted to operate at a pressure up to 120 psig. In another embodiment, the seal is adapted to operate at a runout of up to 0.3 in, 0.25 in, 0.2 in, 0.15 in, 0.1 in, or 0.05 in. In yet another embodiment, the seal is adapted to operate with a leakage no greater than 1 lbm/day, no greater than 0.9 lbm/day, no greater than 0.5 lbm/day, no greater than 0.2 lbm/day, no greater than 0.1 lbm/day, no greater than 0.05 lbm/day, no greater than 0.005 lbm/day, or no greater than 0.00075 lbm/day.

Referring to FIG. 1, a seal 100 in accordance with an embodiment described herein can generally include an annular body 102 defining an inner sidewall 104 and an outer sidewall 106 extending from a base 108. In an embodiment, the seal 100 can be installed within an assembly between an inner hardware 2 and an outer hardware 4. In an embodiment, the inner hardware 2 can include a shaft 6 and the outer hardware 4 can include a housing 8 defining a bore 10 adapted to receive the shaft 6. In certain instances, the shaft 6 can rotate relative to the housing 8. In other instances, the shaft 6 can reciprocate relative to the housing 8. In yet other instances, the shaft 6 can rotate and reciprocate relative to the housing 8. The seal 100 illustrated in FIG. 1 is a schematic view of the seal 100 depicted in the uninstalled state juxtaposed on top of the assembly into which it is receivable.

Figure 3:
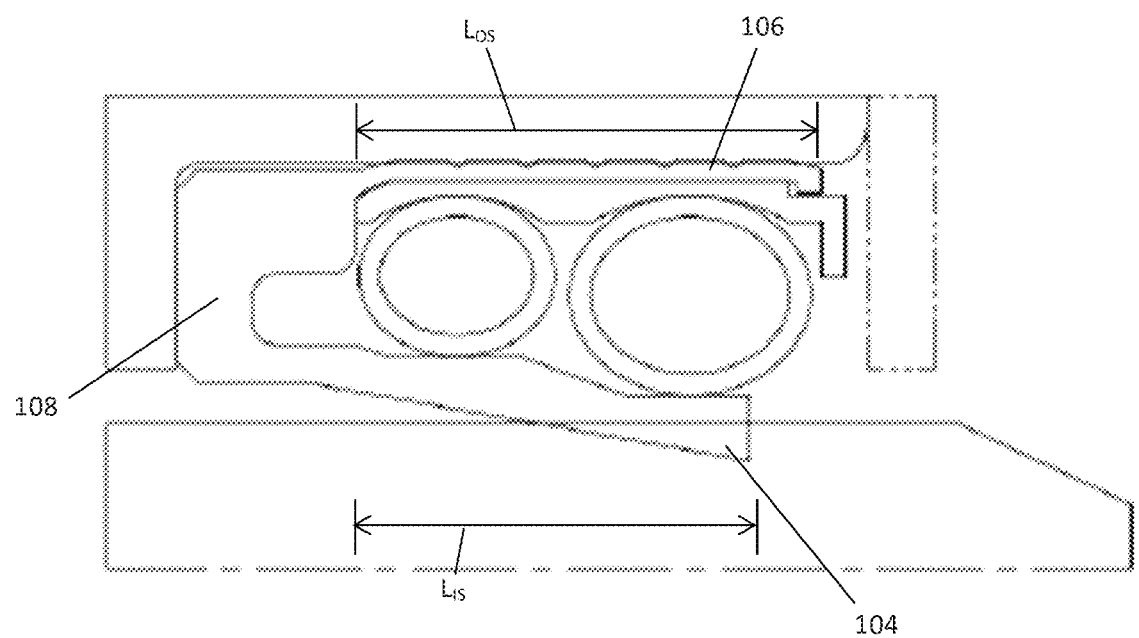
FIG. 3 includes a cross-sectional view of a seal in accordance with another embodiment disposed within a hardware.

In a particular embodiment, the inner and outer sidewalls 104 and 106 of the annular body 102 can extend a same axial distance as one another, as measured from the base 108. In another embodiment, the inner and outer sidewalls 104 and 106 can have different axial lengths as compared to one another. For instance, the inner sidewall 104 can be shorter than the outer sidewall 106. Referring to FIG. 3, in an embodiment the inner sidewall 104 can define a length, $L_{IS}$, as measured from the base 108, and the outer sidewall 106 can define a length, $L_{OS}$, as measured form the base 108, different than $L_{IS}$. For instance, $L_{IS}$ can be no greater than 0.99 $L_{OS}$, no greater than 0.95 $L_{OS}$, no greater than 0.9 $L_{OS}$, no greater than 0.8 $L_{OS}$, no greater than 0.7 $L_{OS}$, or no greater than 0.6 $L_{OS}$. In another embodiment, $L_{IS}$ can be at least 0.1 $L_{OS}$, at least 0.2 $L_{OS}$, at least 0.3 $L_{OS}$, at least 0.4 $L_{OS}$, or at least 0.5 $L_{OS}$.

As illustrated in FIG. 1, the annular body 102 can define a recess 110 extending between the inner sidewall 104 and the outer sidewall 106. In an embodiment, the recess 110 can extend between a first axial end 112 of the annular body 102 and the base 108. In an embodiment, the recess 110 can define a tapered width. In an embodiment, the recess 110 can have a greater radial width, $W_{R1}$, as measured at a location adjacent to an opening 121 as compared to a radial width, $W_{R2}$, as measured at a location of the recess 110 adjacent to the base 108. For instance, in an embodiment, $W_{R1}$ can be at least 1.01 $W_{R2}$, at least 1.02 $W_{R2}$, at least 1.03 $W_{R2}$, at least 1.04 $W_{R2}$, at least 1.05 $W_{R2}$, at least 1.1 $W_{R2}$, at least 1.2 $W_{R2}$, at least 1.3 $W_{R2}$, at least 1.4 $W_{R2}$, or at least 1.5 $W_{R2}$. In another embodiment, $W_{R1}$ can be no greater than 10.0 $W_{R2}$, no greater than 5.0 $W_{R2}$, or no greater than 2.0 $W_{R2}$.

In an embodiment, the recess 110 can define a constant, or generally constant, tapered profile. In the embodiment illustrated in FIG. 1, the recess 110 defines a stepped profile along the inner sidewall 104. In another embodiment, the recess 110 can define a linear profile, a curved profile, or otherwise segmented profile, as viewed along the inner sidewall 104.

A plurality of energizing elements 114 can be disposed within the recess 110. For example, the seal 100 can include at least two energizing elements 114, at least three energizing elements 114, at least four energizing elements 114, or at least five energizing elements 114. In a particular embodiment, the energizing elements 114 can each contact a different portion of the stepped profile of the inner sidewall 104. The energizing elements 114 can be adapted to bias the inner and outer sidewalls 104 and 106 away from one another. In an embodiment, the energizing elements 114 can be adapted to bias the outer sidewall 106 into the housing 8 and the inner sidewall 104 into the shaft 6.

In an embodiment, the energizing elements 114 can include a first energizing element 116 and a second energizing element 118. The first energizing element 116 can be disposed closer to the opening 121 of the recess 110 as compared to the second energizing element 118. In a more particular embodiment, the first energizing element 116 can be disposed adjacent to the opening 121 of the recess 110. The second energizing element 118 can be disposed within the recess 110, such as between the first energizing element 116 and the base 108.

In an embodiment, the first and second energizing elements 116 and 118 can be axially aligned with respect to one another. In a more particular embodiment, the first and second energizing elements 116 and 118 can be disposed in axial arrangement with respect to one another such that plane oriented perpendicular to a length of the shaft 6 intersect only one of the first and second energizing elements 116 and 118. In a more particular embodiment, the first and second energizing elements 116 and 118 can lie along a line L, as viewed in cross section, offset from the central axis of the seal 100 by an angle, α, no greater than 45 degrees, no greater than 40 degrees, no greater than 35 degrees, no greater than 30 degrees, no greater than 25 degrees, no greater than 20 degrees, no greater than 15 degrees, no greater than 10 degrees, no greater than 8 degrees, no greater than 6 degrees, no greater than 4 degrees, no greater than 2 degrees, or no greater than 1 degree. In a more particular embodiment, the first and second energizing elements 116 and 118 can lie along a line L, as viewed in cross section, extending parallel with a central axis of the seal 100.

In an embodiment, at least one of the energizing elements 114 can include a spring. In a more particular embodiment, at least one of the energizing elements 114 can include a helical spring. In yet a more particular embodiment, at least one of the energizing elements 114 can include a helical coiled spring. The coiled spring can include, for example, a single coiled spring or a double coiled spring. In a particular embodiment, the coiled spring can include a canted coil spring. The canted coils can be canted at an angle, as measured with respect to a central axis of the spring, of at least 1°, at least 2°, at least 3°, at least 4°, at least 5°, at least 10°, at least 15°, at least 20°, or at least 25°. In another embodiment, the canted coils can be canted no greater than 80°, no greater than 70°, no greater than 60°, no greater than 50°, or no greater than 40°. In certain instances, the canted coil spring can have a pitch, as measured between adjacent coils parallel with a central axis of the spring, of at least 0.01 inches, at least 0.02 inches, at least 0.03 inches, at least 0.04 inches, or at least 0.05 inches. In another embodiment, the canted coil spring pitch can be no greater than 0.5 inches, no greater than 0.25 inches, no greater than 0.1 inches, or no greater than 0.075 inches. In a particular embodiment, the coil spring can be formed from a wire, such as a cylindrical, or generally cylindrical, wire having a width of at least 0.005 inches, at least 0.01 inches, or at least 0.02 inches. The wire can be formed into the coiled spring and welded to create a closed spring. In a particular embodiment, the wire can be laser welded to form the closed spring.

In another embodiment, at least one of the energizing elements 114 can include a non-helical spring. For instance, at least one of the energizing elements 114 can include a cantilever spring. Exemplary cantilever springs include U-shaped springs and V-shaped springs. Non-helical springs can be formed from deformable materials such as elastic materials. The elastic materials can include, for example, metal, polymers such as elastomers, and combinations thereof. The springs can be adapted to provide biasing pressure against the annular body 102 of the seal 100. In an embodiment, the spring can include a 300 series SS, 17-7 PH SS, Inconel, Hastelloy, Elgiloy, or any combination thereof. In a particular instance, the cantilevered spring can include a uniform cross-sectional profile as measured around the circumference of the energizing element 114. In another instance, the cantilevered spring can have a variable cross-sectional profile as measured around the circumference of the energizing element 114. For example, the cantilevered spring can include a number of cutout portions, weakened portions, strengthened portions, tapers, or combinations thereof. By way of non-limiting example, the cantilevered spring can include one or more cutout portions extending around the circumference of the spring and permitting enhanced flexure thereof.

Other non-helical springs include elastic bodies, such as elastic rings. The elastic rings can include, for instance, O-rings having material elasticity adapted to maintain contact of the annular body 102 with the shaft 6 and bore 10, particularly during periods of runout. In certain instances, elastic rings can further dampen the seal 100 and better suppress resonant harmonics caused by runout. In a particular embodiment, an elastic ring is used in concert with a non-elastic ring. That is, for example, the second energizing element 118 can include an O-ring and the first energizing element 116 can include a helical spring or cantilever spring.

In yet other embodiments, at least one of the energizing elements 114 can include a garter spring.

In an embodiment, the first and second energizing elements 116 and 118 can include a same type of energizing element. Thus, for instance, both the first and second energizing elements 116 and 118 can include coiled springs. In another embodiment, both the first and second energizing elements 116 and 118 can include cantilever springs.

In another embodiment, the first and second energizing elements 116 and 118 can include different types of energizing elements. For instance, the first energizing element 116 can include a helical spring, such as a canted coil spring, and the second energizing element 118 can include a cantilever spring, such as a U-shaped spring. Alternatively, the first energizing element 116 can include a cantilever spring and the second energizing element 118 can include a helical spring.

In an embodiment, the first and second energizing elements 116 and 118 can have different mechanical characteristics as compared to one another. More particularly, the first and second energizing elements 116 and 118 can exhibit different spring properties. In such a manner, the first and second energizing elements 116 and 118 can provide different forces to the annular body 102, creating desirable loading characteristics to maximize sealing efficiency, particularly in assemblies exhibiting high runout (e.g., +/−0.05 inches).

In an embodiment, the first and second energizing elements 116 and 118 can have different unit loads as compared to one another. For instance, the first energizing element 116 can define a first unit load, $L_{S1}$, and the second energizing element 118 can define a second unit load, $L_{S2}$, different from $L_{S1}$. In a more particular embodiment, the first energizing element 116 can have a higher unit load as compared to the second energizing element 118. In another embodiment, the second energizing element 118 can have a higher unit load as compared to the first energizing element 116. For example, in an embodiment, $L_{S2}$ can be at least 1.01 $L_{S1}$, at least 1.02 $L_{S1}$, at least 1.05 $L_{S1}$, at least 1.1 $L_{S1}$, at least 1.2 $L_{S1}$, at least 1.3 $L_{S1}$, at least 1.4 $L_{S1}$, at least 1.5 $L_{S1}$, or at least 2 $L_{S1}$. In another embodiment, $L_{S2}$ can be no greater than 20 $L_{S1}$, no greater than 15 $L_{S1}$, no greater than 10 $L_{S1}$, no greater than 5 $L_{S1}$, or no greater than 3 $L_{S1}$.

In an embodiment, the first and second energizing elements 116 and 118 can have the same size as compared to one another. In another embodiment, the first and second energizing elements 116 and 118 can have different sizes as compared to one another. For example, in an embodiment, the first energizing element 116 can have a greater inner diameter as compared to the second energizing element 118, a greater outer diameter as compared to the second energizing element 118, or both. In a particular instance, the first energizing element 116 can have a first diameter, $D_{S1}$, as measured by the inner or outer diameter of the first energizing element 116, that is at least 1.01 times greater than a second diameter, $D_{S2}$, of the second energizing element 118, as measured by the inner or outer diameter. In an embodiment, $D_{S1}$ can be at least 1.02 $D_{S2}$, at least 1.05 $D_{S2}$, at least 1.1 $D_{S2}$, or at least 1.2 $D_{S2}$. In another embodiment, $D_{S1}$ can be no greater than 3.0 $D_{S2}$, no greater than 2.0 $D_{S2}$, or no greater than 1.5 $D_{S2}$.

In an embodiment, the second energizing element 118 can be adapted to track runout motion caused by shaft-housing misalignment and the first energizing element 116 can be adapted to seal the assembly. At low runout or low speeds (e.g., less than 0.01 inch runout or at rotational speeds less than 30 RPM) the first energizing element 116 can seal the assembly by itself. At higher runout or speeds (e.g., greater than 0.01 inch runout or rotational speeds greater than 30 RPM), the second energizing element 118 may track the misaligned motion, allowing the seal 100 to deflect while maintaining effective seal conditions. In certain instances, e.g., when operating at high runout, both the first and second energizing elements 116 and 118 can operate in concert to maintain effective seal conditions. For example, the second energizing element 118 can maintain the first energizing element 118 in a suitable position to maintain effective seal conditions relative to the shaft 6 and bore 10.

The recess 110 can be sized to accept energizing elements 114 of different diameters. For example, referring still to FIG. 1, the recess 110 can have a first radial width, as measured at a location corresponding with the first energizing element 116, that is different from a second width of the recess 110, as measured at a location corresponding with the second energizing element 118.

In certain embodiments, the seal 100 can further include a resilient ring 120 disposed between at least one of the energizing elements 114 and a portion of the annular body 102 of the seal 100. For instance, the resilient ring 120 can be disposed between the first and second energizing elements 116 and 118 and the outer sidewall 106 of the annular body 102. In a particular embodiment, the resilient ring 120 can be adapted to contact all of the plurality of energizing elements 114. In yet a more particular embodiment, the resilient ring 120 can directly contact an outer edge or area of all of the plurality of energizing elements 114.

In an embodiment, the resilient ring 120 can include a body 122 defining a first recess 124 and a second recess 126. The first recess 124 can be adapted to receive the first energizing element 116 and the second recess 126 can be adapted to receive the second energizing element 118. In a particular embodiment, the first and second recesses 124 and 126 can be spaced apart from one another. In an embodiment, at least one of the first and second recesses 124 and 126 can have a curved cross-sectional profile adapted to receive the respective energizing element 116 or 118. In a particular embodiment, the first and second recesses 124 and 126 can have different radii of curvature as compared to one another. For instance, the first recess 124 can define a larger radius of curvature as compared to the second recess 126. Alternatively, the second recess 126 can have a larger radius of curvature as compared to the first recess 124.

In certain instances, the body 122 of the resilient ring 120 can have a linear, or generally linear, cross-sectional profile. That is, the body 122 of the resilient ring 120 can have a generally elongated cross-sectional profile that corresponds with, or corresponds generally with, a straight line. In a particular embodiment, a surface of the body 122 can deviate by no greater than 25% along the axial length of the body 122.

Figure 2:
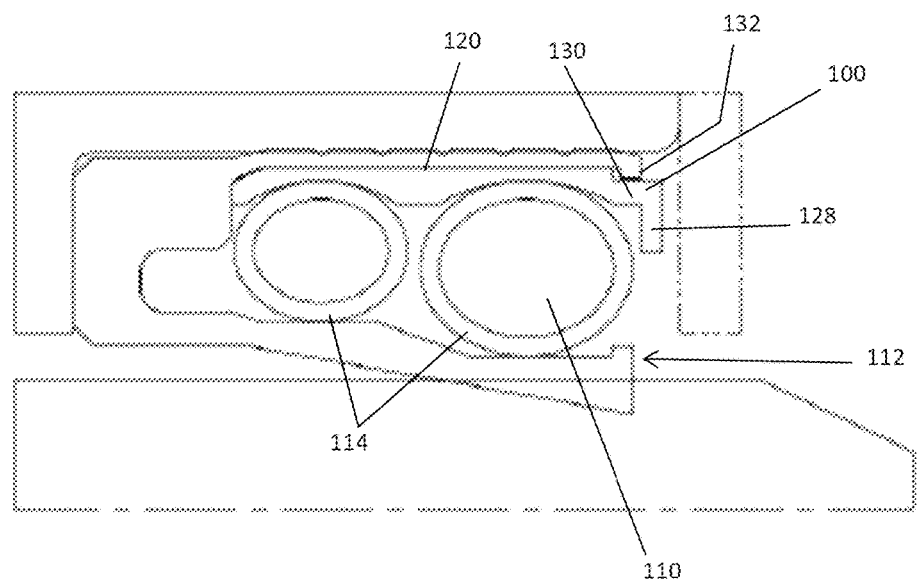
FIG. 2 includes a cross-sectional view of a seal in accordance with another embodiment disposed within a hardware.

Referring to FIG. 2, in an embodiment the resilient ring 120 can include a first retaining lip 128 adapted to prevent axial displacement of the energizing elements 114 from the seal 100. In an embodiment, the first retaining lip 128 can be disposed at or adjacent to the axial end 112 of the annular body 102. In certain instances, the first retaining lip 128 can extend into the recess 110 or an area corresponding with the recess 110 beyond the axial end 112 of the annular body 102. In an embodiment, the first retaining lip 128 can be spaced apart from the energizing elements 114 in the installed or in use state. In another embodiment, the first retaining lip 128 can contact a portion of at least one of the energizing elements 114 in the installed or in use state.

In an embodiment, the resilient ring 120 can include an engagement feature 130 adapted to engage with a portion of the annular body 102, such as a lip 132 on the outer sidewall 106. By way of non-limiting example, the engagement feature 130 can include a notch in the resilient ring 120. The engagement feature 130 can also include a projection, tine, clip, wing, or other projecting or recessed feature adapted to secure with the outer sidewall 106. The engagement feature 130 and lip 132 can engage with one another to prevent axial extrusion of the resilient ring 120 from the annular body 102. In a particular embodiment, the first retaining lip 128 can be disposed on, such as extend from, the engagement feature 130.

Figure 4:
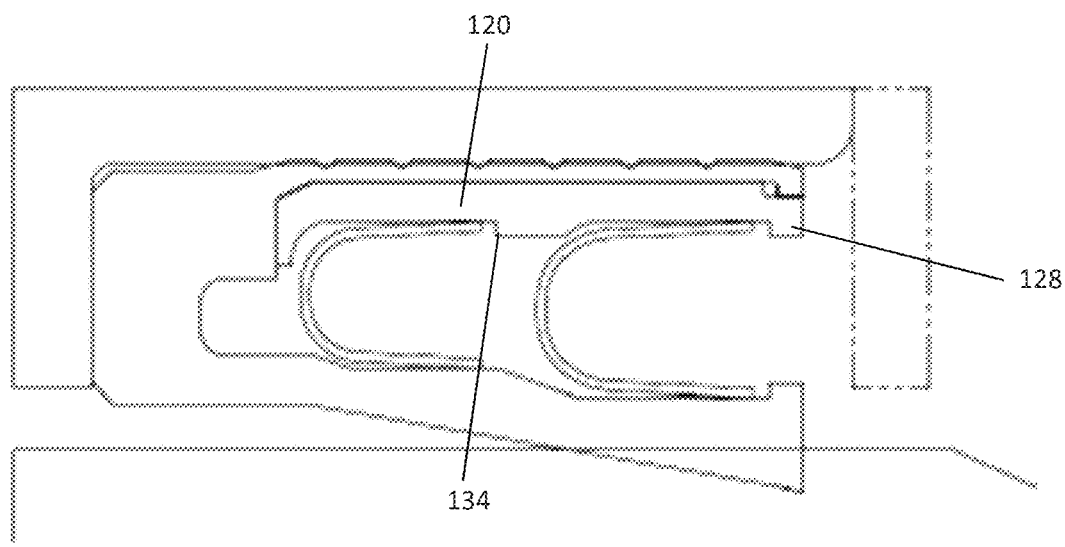
FIG. 4 includes a cross-sectional view of a seal in accordance with another embodiment disposed within a hardware.

In the embodiment illustrated in FIG. 4, the resilient ring 120 includes a second retaining lip 134. The second retaining lip 134 can be spaced apart from the first retaining lip 128, such as for example by the first energizing element 116. The second retaining lip 134 can be adapted to prevent axial extrusion of at least one of the energizing elements 114, such as the second energizing element 118. It is noted that while FIG. 4 illustrates inclusion of the second retaining lip 134 in combination with cantilevered springs, the second retaining lip 134 can be used with helical springs or other spring types. It is further noted that the spacing between the recesses 124 and 126 (FIG. 1) can act similar to the second retaining lip 134. More specifically, the edge 136 of the recess 126 can reduce the possibility of axial extrusion of the second energizing element 118 from the recess 110.

In an embodiment, the first and second retaining lips 128 and 134 can project a same, or generally same, distance from the body 122 of the retaining ring 120 (FIG. 4). In another embodiment, the first and second retaining lips 128 and 134 can project different distances as compared to one another.

As illustrated in FIG. 2, in an embodiment the first retaining lip 128 can project from the body 122 of the resilient ring 120 at a location beyond the axial end 112 of the annular body 102. That is, the first retaining lip 128 can extend from the body 122 of the resilient ring 120 axially beyond the inner sidewall 104, the outer sidewall 106, or both. In such a manner, a volume defined by the recess 110 can remain unchanged by inclusion of the first retaining lip 128. In a particular instance, the use of a first retaining lip 128 disposed beyond the axial end 112 of the annular body 102 can permit selection from a greater range of energizing elements 114, particularly those with larger diameters or features.

In an embodiment, the resilient ring 120 can float relative to the annular body 102. As used herein, "float" can refer to the ability of two or more objects to move relative to one another. For example, the resilient ring 120 can rotate relative to the annular body 102 during operation of the seal 100 in embodiments where the resilient ring 120 floats. In an embodiment, the resilient ring 120 can be coupled to the annular body 102 by only the engagement element 130 and the lip 132, thereby preventing axial extrusion of the resilient ring 120 from the annular body 102 without preventing rotational movement therebetween. In an embodiment, the resilient ring 120 can be discrete from the annular body 102. That is, the resilient ring 120 is not embedded within the annular body 102.

Referring to FIG. 1, the outer sidewall 106 of the annular body 102 can define an outer surface 138 comprising at least one, such as a plurality of, sealing features. The sealing features 140 can include, for instance, a plurality of recesses, indentations, projections, wipers, pockets, or any combination thereof. In an embodiment, the sealing features 140, such as the plurality of recesses, can extend around at least a portion of the circumference of the seal 100. In a more particular embodiment, the sealing features 140 can extend around the entire circumference of the seal 100.

In an embodiment, the inner sidewall 104 can define a tapered inner surface 142, as viewed in the uninstalled state. The base 108 of the annular body 102 can include a cutout 144 adapted to permit greater flexure of the inner and outer sidewalls 104 and 106 relative to one another. As the seal 100 is installed between the shaft 6 and housing 8, the inner sidewall 104 can deflect inward to rest against the shaft 6. Deflection can occur, among other areas, in the cutout 144 of the annular body 102. The use of first and second energizing elements 116 and 118 can provide sealing and backup support against fluid ingress or egress. The lip 146 of the inner sidewall 104 can act as a scraper along the shaft 6 to clear debris and particulate from the shaft 6. Use of a scraper lip 146 can permit enhanced sealing, particularly in instances of high runout (e.g., +/−0.05 inches).

In an embodiment, the annular body 102 can be formed from a polymeric material. Exemplary materials include nylon, polyether ether ketone (PEEK), polyether sulfone (PES), polytetrafluoroethylene (PTFE), polyimide, or an organic or inorganic composite. Further exemplary polymers include fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyethylene (PE), ultra high molecular weight polyethylene (UHMW-PE), polysulfone, polyamide (PA), polyphenylene oxide, polyphenylene sulfide (PPS), polyurethane, polyester, liquid crystal polymers (LCP), or any combination thereof. In an embodiment, the annular body 102 can include a low friction material. For example, in a particular embodiment, the annular body 102 includes PTFE. The low friction material can be integral throughout the annular body 102, e.g., the annular body 102 is formed from the low friction material or disposed along an outer surface of the annular body 102, e.g., coated or otherwise applied thereon.

In an embodiment, the annular body 102 can include a filler. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

Figure 5:
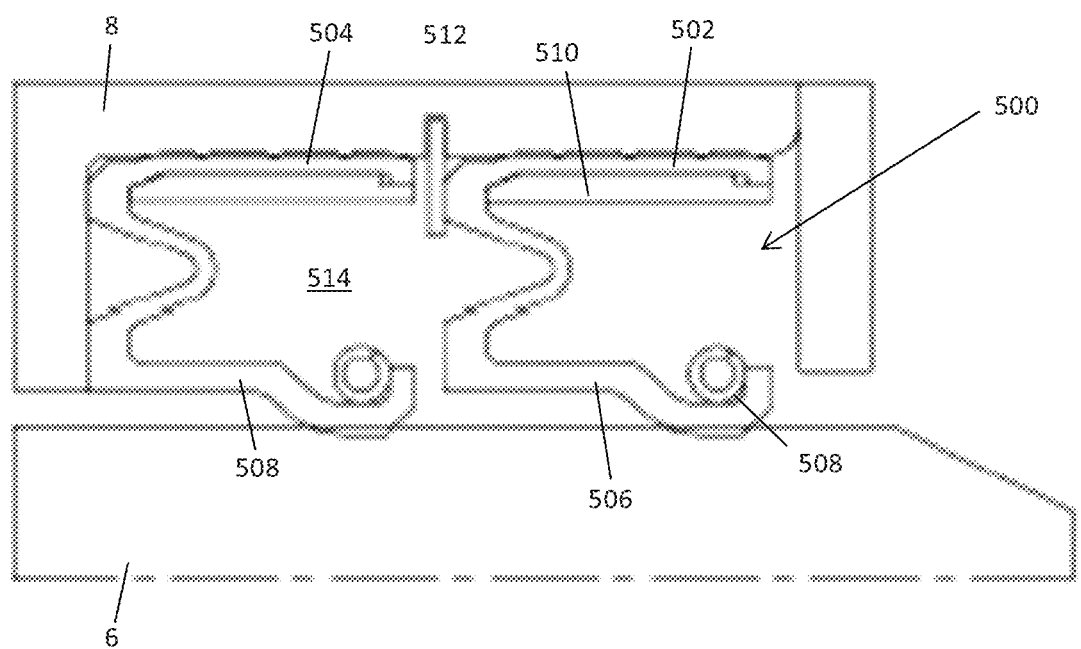
FIG. 5 includes a cross-sectional view of a seal in accordance with another embodiment disposed within a hardware.

FIG. 5 illustrates an embodiment of a seal 500 in accordance with another embodiment. The seal 500 includes a multiple-body design incorporating a first seal element 502 and a second seal element 504. In the illustrated embodiment, the first and second seal elements 502 and 504 can have similar sizes, shapes, properties, or combinations thereof. In a more particular embodiment, the first and second seal elements 502 and 504 can be identical, or generally identical. In another embodiment, the first and second seal elements 502 and 504 can have different sizes, shapes, properties, or combinations thereof. While the following reference is made to the first seal element 502, the second seal element 504 can have any number of similar or different attributes. Moreover, while the following reference is made to a particular embodiment of the seal 500, it should be understood that seals described in accordance with other embodiments herein can have a multiple-body design.

In an embodiment, the first seal element 502 can include an annular body 506, an energizing element 508, and a resilient member 510 disposed between the annular body 506 and the energizing element 508. In an embodiment, the resilient member 510 can contact the annular body 506 and be spaced apart from the energizing element 508. In another embodiment, the resilient member 510 can contact the energizing element 508 and be spaced apart from the annular body 506.

A retaining feature 512 can be disposed between the first and second seal elements 502 and 504. In an embodiment, the retaining feature 512 can include a ring. The ring can be adapted to seat relative to a cutout within the housing 8. In an embodiment, at least one of the first and second seal elements 502 and 504 can contact the retaining feature 512 during use.

In an embodiment, the first and second seal elements 502 and 504 can include energizing elements 508 having one or more different characteristics. For instance, the energizing elements 508 can have different diameters, spring properties, dimensions, or combinations thereof.

In an embodiment, the recess 514 formed within the second seal element 504 can act as a storage area for leakage of fluid that passes the first sealing interface between the shaft 6 and the seal 500.

EXAMPLES

A sample seal substantially similar to the embodiment illustrated in FIG. 1 is prepared and installed between a bore having a diameter of approximately 6.0 inches and a shaft with a diameter of approximately 5.25 inches. The shaft is formed from 465 stainless steel and the housing defining the bore from titanium 6Al-4V. In the uninstalled state, the sample seal has a maximum radial thickness, as measured between innermost and outermost portions thereof, of approximately 0.435 inches. The base of the sample seal has a radial thickness of approximately 0.307 inches. The recess between the inner and outer sidewalls of the seal has a minimum width, as viewed in cross section, of approximately 0.25 inches and a maximum width of approximately 0.307 inches. The sample seal is formed from a fluorinated polymer, including PTFE.

The assembly is subjected to a Low Temperature Leakage Rate Test and a High Temperature Leakage Rate Test. In the Low Temperature Leakage Rate Test, a misalignment runout between the shaft and bore is set to +/−0.025 inches. A ΔP (i.e., pressure differential) of the assembly is set to 14.7 psig and temperatures are varied between −32° F. and 150° F. In the High Temperature Leakage Rate Test, misalignment runout between the shaft and bore is set to +/−0.05 inches. A ΔP of the assembly is set to 14.7 psig and temperatures are varied between 70° F. and 300° F. The shaft-to-housing axial displacement is +/−0.015 inches and the shaft to housing angular displacement is 0.5 degrees.

In the Low Temperature Leakage Rate Test, the sample seal had a leakage rate less than $7.4 \times 10^{-4}$ lbm/day. In the High Temperature Leakage Rate Test, the sample seal had a leakage rate less than 1 lbm/hour.

Embodiment 1. A seal comprising:
an annular body defining an inner sidewall and an outer sidewall extending from a base; and
a plurality of energizing elements disposed within a recess between the inner and outer sidewalls, wherein at least two adjacent energizing elements of the plurality of energizing elements have different unit loads as compared to one another, and wherein the at least two adjacent energizing elements contact the inner sidewall.

Embodiment 2. An assembly comprising:
a housing defining a bore;
a shaft disposed within the bore; and
a seal disposed within the bore between the housing and shaft, the seal comprising:
an annular body defining an inner sidewall and an outer sidewall extending from a base; and
a plurality of energizing elements disposed within a recess between the inner and outer sidewalls, wherein at least two adjacent energizing elements of the plurality of energizing elements have different unit loads as compared to one another, and wherein the at least two adjacent energizing elements contact the inner sidewall.

Embodiment 3. The seal or assembly of any one of the preceding embodiments, wherein the at least two adjacent energizing elements contact the outer sidewall.

Embodiment 4. The seal or assembly of any one of embodiments 1 and 2, further comprising a resilient ring disposed between the at least two adjacent energizing elements of the plurality of energizing elements and the outer sidewall of the annular body.

Embodiment 5. The seal or assembly of embodiment 4, wherein the resilient ring is adapted to contact all of the plurality of energizing elements.

Embodiment 6. The seal or assembly of any one of embodiments 4 and 5, wherein the resilient ring comprises a body defining a first recess adapted to receive a first energizing element of the plurality of energizing elements and a second recess adapted to receive a second energizing element of the plurality of energizing elements.

Embodiment 7. The seal or assembly of embodiment 6, wherein the first and second recesses are spaced apart from one another.

Embodiment 8. The seal or assembly of any one of embodiments 6 and 7, wherein the first and second recesses comprise different radii of curvature as compared to one another.

Embodiment 9. The seal or assembly of embodiment 8, wherein the recess closer to the base of the annular body has a smaller radius of curvature as compared to the recess further from the base.

Embodiment 10. The seal or assembly of any one of embodiments 4-9, wherein the resilient ring further comprising a first retaining lip adapted to prevent axial extrusion of the energizing elements from the recess of the seal.

Embodiment 11. The seal or assembly of embodiment 10, wherein the retaining lip extends from the recess axially beyond the inner sidewall, the outer sidewall, or both.

Embodiment 12. The seal or assembly of any one of embodiments 4-11, wherein the resilient ring further comprises a second retaining lip disposed between the at least two adjacent energizing elements and adapted to prevent axial displacement of at least one of the energizing elements from the seal.

Embodiment 13. The seal or assembly of any one of embodiments 4-12, wherein the resilient ring floats relative to the annular body.

Embodiment 14. The seal or assembly of any one of embodiments 4-13, wherein the resilient ring has a generally linear cross-sectional profile.

Embodiment 15. The seal or assembly of any one of the preceding embodiments, wherein at least one of the plurality of energizing elements comprises a helical spring.

Embodiment 16. The seal or assembly of any one of the preceding embodiments, wherein at least one of the plurality of energizing elements comprises a U-shaped spring.

Embodiment 17. The seal or assembly of any one of the preceding embodiments, wherein the at least two adjacent energizing elements of the plurality of energizing elements are a same type of energizing element.

Embodiment 18. The seal or assembly of any one of the preceding embodiments, wherein the seal comprises a first energizing element disposed in the recess and a second energizing element disposed in the recess between the base and the first energizing element, and wherein the second energizing element has a higher unit load as compared to the first energizing element.

Embodiment 19. The seal or assembly of embodiment 18, wherein the first energizing element has a first unit load, $L_{S1}$, and the second energizing element has a second unit load, $L_{S2}$, and wherein $L_{S2}$ is at least 1.01 $L_{S1}$, at least 1.02 $L_{S1}$, at least 1.05 $L_{S1}$, at least 1.1 $L_{S1}$, at least 1.2 $L_{S1}$, at least 1.3 $L_{S1}$, at least 1.4 $L_{S1}$, at least 1.5 $L_{S1}$, or at least 2 $L_{S1}$.

Embodiment 20. The seal or assembly of any one of embodiments 18 and 19, wherein the first energizing element has a greater diameter as compared to the second energizing element.

Embodiment 21. The seal or assembly of any one of the preceding embodiments, wherein the inner sidewall is shorter than the outer sidewall.

Embodiment 22. The seal or assembly of any one of embodiments 1-20, wherein the inner and outer sidewalls have same lengths as compared to one another.

Embodiment 23. The seal or assembly of any one of the preceding embodiments, wherein the seal defines a central axis, and wherein the inner sidewall is canted relative to the central axis of the seal.

Embodiment 24. The seal or assembly of embodiment 23, wherein the outer sidewall is generally parallel with the central axis of the seal.

Embodiment 25. The seal or assembly of any one of the preceding embodiments, wherein the inner sidewall defines a first thickness at a first location and a second thickness at a second location, and wherein the first thickness is greater than the second thickness.

Embodiment 26. The seal or assembly of embodiment 25, wherein the second location is disposed between the first location and the base of the seal.

Embodiment 27. The seal or assembly of any one of the preceding embodiments, wherein the outer sidewall defines an outer surface of the seal, and wherein the outer surface of the outer sidewall comprises a plurality of recesses extending around at least a portion of the circumference of the seal.

Embodiment 28. The seal or assembly of any one of the preceding embodiments, wherein the base of the annular body defines a cutout extending from the recess, and wherein the cutout is adapted to permit greater flexure of the inner and outer sidewalls relative to one another.

Embodiment 29. The seal or assembly of any one of the preceding embodiments, wherein the seal is adapted to operate at a range of temperatures between −32° F. and 300° F., pressure of 14.7 psig, and runout of 0.05 in. with a leakage no greater than 1 lbm/day.

Embodiment 30. The seal or assembly of any one of the preceding embodiments, wherein the base of the seal is adapted to be spaced apart from the shaft in the installed state.

Embodiment 31. The seal or assembly of any one of the preceding embodiments, wherein the annular body comprises a polymer, such as a low friction polymer, such as PTFE.

Embodiment 32. The seal or assembly of embodiment 31, wherein the annular body comprises a filler material.

Embodiment 33. The seal or assembly of any one of the preceding embodiments, wherein the seal is adapted for rotational movement, reciprocal movement, or both.

Embodiment 34. An assembly comprising:
a housing defining a bore;
a shaft disposed within the bore; and
a seal disposed within the bore between the housing and shaft,
wherein the assembly has a Low Temperature Leakage Rate less than 0.0005 lbm/hr at a runout of 0.025 in and a High Temperature Leakage Rate less than 1 lbm/day at a runout of 0.05 in.

Embodiment 35. The assembly of embodiment 34, wherein the seal comprises:
an annular body defining an inner sidewall and an outer sidewall extending from a base;
a plurality of energizing elements disposed between the inner and outer sidewalls, wherein at least two of the plurality of energizing elements have different unit loads as compared to one another; and
a resilient ring disposed between all of the plurality of energizing elements and the outer sidewall of the annular body.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A seal comprising:
an annular body defining an inner sidewall and an outer sidewall extending from a base, wherein the inner sidewall and the outer sidewall are extending away from each other; and
a plurality of energizing elements disposed within a recess between the inner and outer sidewalls, wherein at least two adjacent energizing elements of the plurality of energizing elements have different unit loads as compared to one another, and wherein the at least two adjacent energizing elements contact the inner sidewall, and further comprising a resilient ring disposed between the at least two adjacent energizing elements of the plurality of energizing elements and the outer sidewall of the annular body, wherein the resilient ring comprises a body defining a first recess receiving a first energizing element of the plurality of energizing elements and a second recess receiving a second energizing element of the plurality of energizing elements, wherein the first recess and the second recess have different radii of curvature as compared to one another.

2. An assembly comprising:
a housing defining a bore;
a shaft disposed within the bore; and
a seal disposed within the bore between the housing and shaft, the seal comprising:
an annular body defining an inner sidewall and an outer sidewall extending from a base, wherein the inner sidewall and the outer sidewall are extending away from each other; and
a plurality of energizing elements disposed within a recess between the inner and outer sidewalls, wherein at least two adjacent energizing elements of the plurality of energizing elements have different unit loads as compared to one another, and wherein the at least two adjacent energizing elements contact the inner sidewall, and further comprising a resilient ring disposed between the at least two adjacent energizing elements of the plurality of energizing elements and the outer sidewall of the annular body, wherein the resilient ring comprises a body defining a first recess adapted to receive a first energizing element of the plurality of energizing elements and a second recess adapted to receive a second energizing element of the plurality of energizing elements, wherein the first recess and the second recess have different radii of curvature as compared to one another.

3. The seal of claim 1, wherein the at least two adjacent energizing elements contact the outer sidewall.

4. The seal of claim 1, wherein the resilient ring is adapted to contact all of the plurality of energizing elements.

5. The seal of claim 1, wherein the first and second recesses are spaced apart from one another.

6. The seal of claim 1, wherein the first and second recesses comprise different radii of curvature as compared to one another.

7. The seal of claim 1, wherein the resilient ring further comprising a first retaining lip adapted to prevent axial extrusion of the energizing elements from the recess of the seal.

8. The seal of claim 1, wherein the resilient ring further comprises a second retaining lip disposed between the at least two adjacent energizing elements and adapted to prevent axial displacement of at least one of the energizing elements from the seal.

9. The seal of claim 1, wherein at least one of the plurality of energizing elements comprises a helical spring.

10. The seal of claim 1, wherein at least one of the plurality of energizing elements comprises a U-shaped spring.

11. The seal of claim 1, wherein the seal comprises a first energizing element disposed in the recess and a second energizing element disposed in the recess between the base and the first energizing element, and wherein the second energizing element has a higher unit load as compared to the first energizing element.

12. The seal of claim 1, wherein the seal defines a central axis, and wherein the inner sidewall is canted relative to the central axis of the seal.

13. The seal of claim 12, wherein the outer sidewall is generally parallel with the central axis of the seal.

14. The seal of claim 1, wherein the inner sidewall defines a first thickness at a first location and a second thickness at a second location, and wherein the first thickness is greater than the second thickness.

15. The seal of claim 1, wherein the outer sidewall defines an outer surface of the seal, and wherein the outer surface of the outer sidewall comprises a plurality of recesses extending around at least a portion of the circumference of the seal.

16. The seal of claim 1, wherein the annular body comprises a polymer, such as a low friction polymer, such as PTFE.

17. The assembly of claim 2,
wherein the assembly has a Low Temperature Leakage Rate less than 0.0005 lbm/hr at a runout of 0.025 in and a High Temperature Leakage Rate less than 1 lbm/day at a runout of 0.05 in.

18. The seal of claim 1, wherein resilient ring has a generally linear cross-sectional profile.

* * * * *